Patented Oct. 31, 1922.

1,434,094

UNITED STATES PATENT OFFICE.

JOHN M. COLONY, OF NEWTON, MASSACHUSETTS.

PROCESS OF MAKING A MILK PRODUCT.

No Drawing.      Application filed January 9, 1920. Serial No. 350,377.

*To all whom it may concern:*

Be it known that I, JOHN M. COLONY, a citizen of the United States, residing at Newton, in the county of Middlesex and State of Massachusetts, have invented certain Improvements in Processes of Making a Milk Product, of which the following description is a specification.

This invention relates to processes of producing what may be termed "reconstructed milk," that is, milk made from ingredients originally obtained from fresh milk.

Dry milk powder is now a very common article of commerce and it has been found through a relatively extensive commercial use that this powder keeps sweet and in an entirely satisfactory condition over a long period of time provided it is kept dry and contains no butter fat. In other words, the milk powder obtained by dehydrating skimmed milk can be preserved very satisfactorily. The milk produced by adding the proper quantity of water to this powder has only a very limited market and, since it contains practically no butter fat, is not at all suitable for general household use. It has, therefore, been proposed heretofore to enrich this milk by adding to it the quantity of butter necessary to make a whole milk equivalent to fresh milk, and thus to produce an article that may be termed "reconstructed milk" which would supply the demand in those localities where it is impossible or very expensive to obtain fresh milk. The prior attempts directed to this end, however, have not proved successful in producing an article resembling fresh milk closely enough to be marketable. The chief difficulties which have been encountered in these prior processes are that the butter fat either separates very quickly from the other constituents of the milk, rising to the top in the form of a yellow scum which not only presents a disagreeable appearance but also is unpalatable, or else that the butter fat is present in such small globules or particles that the cream does not rise at all.

A commercially successful product of this character must resemble fresh milk so closely in taste, appearance and composition that it is impossible for the average purchaser to distinguish it from fresh milk and the cream must rise on it just as it does on fresh milk. In other words, the reconstructed milk must be substantially identical with fresh milk in characteristics and behavior. The present invention provides a process that produces a milk answering these requirements.

According to the preferred method of practising the present process, skimmed milk powder is mixed with a suitable quantity of water to form a skimmed milk of normal composition. This step of the process may be carried on in a suitable vat preferably equipped with a steam heated coil and some form of an agitator, or the coil itself may form the agitator. After the milk powder has been dissolved a quantity of butter is added to the mixture sufficient to produce a rich cream, say for example, a forty per cent cream. It is usually preferable to pasteurize the milk and this operation may conveniently be carried on in conjunction with the present process by heating the mixture while it is in the vat, this heating also aiding to melt the butter. The point to which the mixture is heated may be a normal pasteurizing temperature, say, for example, 140° F.

After the butter has all melted and the mixture has been reduced to as homogeneous a composition as can be conveniently produced in the vat, it is then run through an emulsifier, low pressure homogenizer, or "creamer." These machines are well known to those skilled in this art and they operate to break up the large globules of butter fat into smaller globules and thus reduce the entire fluid mixture to a uniform creamy consistency. When this liquid flows from the emulsifier it is a reconstructed cream containing, say, forty per cent butter fat.

In another vat, preferably like that above described, skimmed milk powder is added to a suitable quantity of water to form another batch of skimmed milk of normal composition, this batch also being heated up to substantially the same temperature as the cream produced in the manner above described. The milk and cream so produced are then brought together in suitable proportions to form a mixture having the composition of fresh milk. It is obvious that this composition can be controlled as accurately as may be desired for practical purposes, and that the percentage of butter fat may be as high as desired by the trade to be supplied.

I have found by actual practice of the process above described that it produces a reconstructed milk which tastes and acts exactly like fresh milk, the cream rising on it after it has set several hours in exactly the same way that it rises on fresh milk so that it cannot be distinguished by the customer from fresh milk. Since the composition of the milk can be accurately controlled it can be made as good or better than average fresh milk.

While I do not wish to be confined to any theory as to the advantageous results produced by this process, I believe that these improved results are due to the fact that the cream and skimmed milk are reconstructed separately before being mixed to form a milk of normal composition.

After the cream and skimmed milk have been brought together as above described and mixed, the resulting product is then run over a suitable cooler of the type used in dairies and the milk is then bottled for delivery.

I consider it preferable to combine the process of reconstructing milk with that of pasteurizing, as above described, since pasteurizing now is usually required, and also for the reason that the heating of the milk during the making of the cream is of advantage in melting the butter and thus facilitates this step of the process. The process of pasturizing, however, is not essential to the successful practice of the present invention. It is also contemplated that butter substitutes may be used in this process although I consider that superior results are obtained when butter is used.

What is claimed as new is:

1. The process of making reconstructed milk which consists in making a reconstructed cream, making a reconstructed skimmed milk, and mixing the cream and milk so produced in suitable proportions to form whole milk having the required composition.

2. The process of making reconstructed milk which consists in dissolving skimmed milk powder in a suitable quantity of water to form skimmed milk, adding sufficient butter to said mixture to produce a rich cream, emulsifying the cream so produced, dissolving an additional quantity of milk powder in water in a separate container to form skimmed milk, and then mixing the cream and skimmed milk so produced in suitable proportions to form a reconstructed milk having substantially the composition of fresh milk.

3. The process of making reconstructed milk which consists in dissolving skimmed milk powder in a suitable quantity of water to form skimmed milk, adding sufficient butter to said mixture to produce a rich cream, heating the mixture to melt the butter, emulsifying said mixture to produce a cream of homogeneous composition, dissolving an additional quantity of milk powder in a separate container to produce another batch of skimmed milk, then mixing the cream and skimmed milk so produced in suitable proportions to form whole milk having substantially the composition of fresh milk, and finally cooling the milk.

4. The process of making reconstructed pasteurized milk, which consists in dissolving skimmed milk powder in a suitable quantity of water to form skimmed milk, adding sufficient butter to said mixture to produce a rich cream, heating the mixture to a pasteurizing temperature, emulsifying said mixture to produce a cream of substantially homogeneous composition, dissolving an additional quantity of milk powder in water to produce another batch of skimmed milk, heating said batch of skimmed milk to a pasteurizing temperature, mixing the cream and skimmed milk so produced in suitable proportions while they are still hot to form whole milk having substantially the composition of fresh milk, and then cooling the milk so produced.

In testimony whereof I have signed my name to this specification.

JOHN M. COLONY.